(Model.)
R. STERN.
DECORATION OF SILVERED GLASS SURFACES AND SIGNS.
No. 322,864. Patented July 21, 1885.
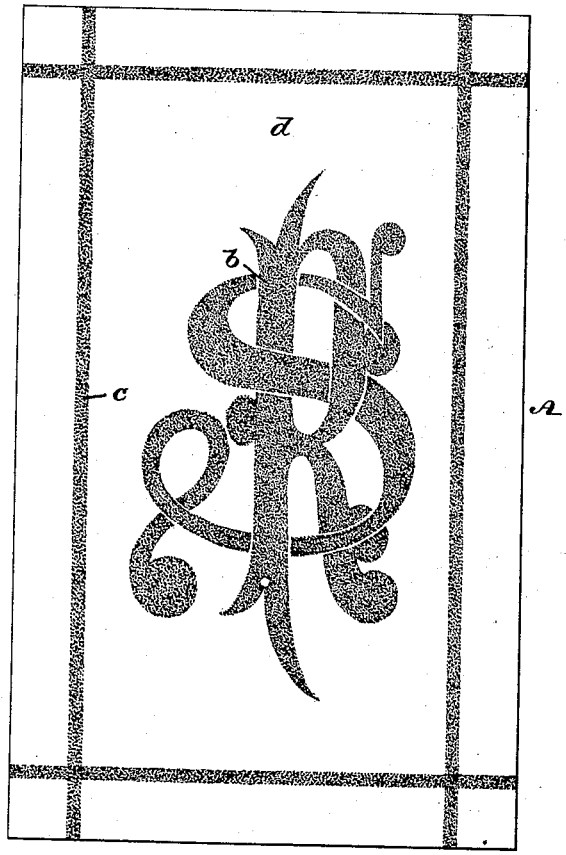
WITNESSES:
A. P. Grant
W. F. Kirches
INVENTOR:
Rebecca Stern
BY John A. Wiedersheim
ATTORNEY.

UNITED STATES PATENT OFFICE.

REBECCA STERN, OF PHILADELPHIA, PENNSYLVANIA.

DECORATION OF SILVERED GLASS SURFACES AND SIGNS.

SPECIFICATION forming part of Letters Patent No. 322,864, dated July 21, 1885.

Application filed February 4, 1885. (Model.)

*To all whom it may concern:*

Be it known that I, REBECCA STERN, a citizen of the United States, residing in the city and county of Philadelphia, State of Pennsylvania, have invented a new and useful Improvement in Decoration of Silvered Glass Surfaces and Signs, which improvement is fully set forth in the following specification and accompanying drawing, in which the figure is a face view of a plate of silvered glass embodying my invention.

My invention relates to an improvement in the decoration of silvered glass surfaces and signs, as set forth in the Letters Patent of the United States, No. 305,732, granted on the 23d day of September, 1884, to Reuben Cohen, executor or administrator of the estate of Louis Stern, deceased; and it consists in etching the face of silvered glass for ornaments, signs, decorative purposes, &c., in such manner as to produce a dull letter or letters, ornament or ornaments, and a bright ground.

In the drawing, A represents a plate of glass having a backing of silver, although other light metal may be employed. On the face of the plate is a letter in the form of a monogram, as at *b*, and a border, *c;* but any other letter or border or any ornamentation or design may be made on said face, said letter, design, &c., being dull and the ground *d* being bright, both letter, design, &c., and the ground appearing on the face of the plate, it being remembered that the silver is on the back thereof.

The design, letter, &c., is marked out on the face of the glass, and a coating of any suitable composition or material—such as asphaltum, wax, &c.—laid on the surface of the glass, excepting on the part occupied by the design. An acid, generally what is known as "white acid," is then poured on the face of the glass where unprotected by the asphaltum, &c., and in the course of a few moments, the portion of the glass with which the acid is in contact becomes crystallized. The acid is then poured off, the glass well washed with cold water, and turpentine applied to the asphaltum, &c., to dissolve the same, the plate being finally washed with soap and water.

It will be seen that the letter, design, &c., has a crystallized or dull surface and the ground is bright, the whole producing a beautiful sign, ornament, &c., in which the letter, design, &c., is quite conspicuous, apparently in relief, and the ground is brilliant and clear.

In lieu of silver as a backing, I may employ gold, tinfoil, and other metal, pearl dust, paint, &c.

Having thus described my invention, what I claim as new, and desire to secure by Letters Patent, is—

1. An ornament, &c., formed of glass having a silvered back and an etched face, the design thereon being crystalized or dull and the ground being bright, as stated.

2. The method of forming an ornament, &c., consisting in marking out on the face of a plate of glass having a silvered back the design, then covering the ground portion with asphaltum or other suitable material, next etching said face where the design is laid off, and finally removing the acid and asphaltum, the design being crystallized and appearing dull and the ground left bright, substantially as stated.

REBECCA STERN.

Witnesses:
JOHN A. WIEDERSHEIM,
A. P. GRANT.